United States Patent
Greene et al.

(10) Patent No.: US 6,844,635 B2
(45) Date of Patent: Jan. 18, 2005

(54) REACTION FORCE TRANSFER SYSTEM

(75) Inventors: Philip M. Greene, Hingham, MA (US);
Scott Hero, Westboro, MA (US);
Douglas Bittner, Worcester, MA (US)

(73) Assignee: Dover Instrument Corporation, Westborough, MA (US)

( * ) Notice: Subject to any disclaimer, the term of this patent is extended or adjusted under 35 U.S.C. 154(b) by 0 days.

(21) Appl. No.: 10/155,058

(22) Filed: May 24, 2002

(65) Prior Publication Data

US 2003/0218398 A1 Nov. 27, 2003

(51) Int. Cl.[7] .............................................. H01L 21/00
(52) U.S. Cl. ...................................................... 310/12
(58) Field of Search ............................ 310/12, 13, 14; 82/132, 133

(56) References Cited

U.S. PATENT DOCUMENTS

| | | | |
|---|---|---|---|
| 5,260,580 A | 11/1993 | Itoh et al. | |
| 5,528,118 A | 6/1996 | Lee | 318/568.17 |
| 5,744,924 A | 4/1998 | Lee | 318/568.17 |
| 5,939,852 A | 8/1999 | Akutsu et al. | |
| 5,953,105 A * | 9/1999 | Van Engelen et al. | 355/53 |
| 5,982,128 A | 11/1999 | Lee | 318/568.16 |
| 6,008,500 A | 12/1999 | Lee | 250/548 |
| 6,020,710 A | 2/2000 | Lee | 318/649 |
| 6,087,797 A | 7/2000 | Lee | 318/649 |
| 6,150,787 A | 11/2000 | Lee | 355/53 |
| 6,175,404 B1 | 1/2001 | Lee | 318/649 |
| 6,246,202 B1 | 6/2001 | Lee | 318/649 |
| 6,246,204 B1 * | 6/2001 | Ebihara et al. | 318/649 |
| 6,281,654 B1 | 8/2001 | Lee | 318/649 |
| 6,316,901 B2 | 11/2001 | Lee | |
| 6,378,672 B1 * | 4/2002 | Wakui | 188/378 |
| 6,396,566 B2 * | 5/2002 | Ebinuma et al. | 355/53 |
| 6,493,062 B2 * | 12/2002 | Tokuda et al. | 355/53 |
| 6,504,566 B1 * | 1/2003 | Yamada et al. | 347/240 |
| 6,603,531 B1 * | 8/2003 | Binnard | 355/53 |
| 6,654,095 B1 * | 11/2003 | Nishi | 355/30 |

OTHER PUBLICATIONS

U.S. patent application Publication No. US2002/0054280 A1—Driving Apparatus and Exposure Apparatus, Tokuda, et al., publshied May 9, 2002.
International Search Report re: International Appln. PCT/US03/16529 mailed Sep. 24, 2003.

* cited by examiner

Primary Examiner—Thanh Lam
Assistant Examiner—Judson H. Jones
(74) Attorney, Agent, or Firm—Choate, Hall & Stewart

(57) ABSTRACT

Reaction force transfer system includes a frame and a machine base supported by the frame through passive isolation structure. A carriage is supported for motion with respect to the machine base and a motor is provided having a stator coupled to the frame and a forcer coupled to the carriage to move the carriage with respect to the machine base.

9 Claims, 1 Drawing Sheet

REACTION FORCE TRANSFER SYSTEM

BACKGROUND OF THE INVENTION

This invention relates to a reaction force transfer method to reduce machine base motions due to stage acceleration in high through-put motion applications.

A large class of precision machines position and move a work piece relative to a tool. The work piece, the tool, or both are moved along a number of motion axes. Because of the high precision required, such machines are mounted to provide substantial isolation from ambient vibration sources. Modem passive isolation systems are extremely effective at attenuating the amplitude of ambient environmental vibrations that enter the machine. Isolation is typically accomplished by vertically supporting a large machine mass such as a granite base on a soft spring, yielding a very low system natural frequency. Damping is added to minimize disturbances near this low natural frequency.

A major disturbance arises when a horizontal axis of a machine accelerates or decelerates rapidly. The large force needed to accelerate a payload mass along an axis generates an equal reaction force into the machine's "stationary" structure according to Newton's Third Law. This reaction force accelerates the entire machine mass, including the machine base, which is, as stated above, typically a massive granite slab. The only resistance to the machine's lateral motion is the relatively soft horizontal spring rate of the isolation system. Compounding the problem is the low damping ratio of the isolators in the horizontal directions. The machine thus oscillates side-to-side with unacceptable amplitude and settling time.

This oscillation of the machine base may cause other problems. The machine base motion is a transient excitation to all other structures attached to it. This input will excite resonant frequencies in such structures. These structures may include vibration sensitive devices such as motion axes, metrology instruments, and the machine's tool (e.g., an atomic force microscope or optical system).

Active isolation systems are available that can counteract this machine oscillation problem. However, active isolation is extremely expensive. Alternatively, it is known that force cancellation methods can be used. In this case, a dummy axis is added to the machine and is programmed to make opposing moves which cancel the reaction forces caused by the real machine axes. In some machine configurations, this force cancellation technique can be elegantly implemented. In many other machine configurations, however, this solution is impractical because of the doubling of power requirements, increased space requirements, and increased expense.

SUMMARY OF THE INVENTION

According to the invention, the reaction force transfer system includes a frame and a machine base supported by the frame through passive isolation structure. A carriage is supported for motion with respect to the machine base. A motor having a stator coupled to the frame and a forcer coupled to the carriage moves the carriage with respect to the machine base. In a preferred embodiment, the motor is a linear motor and the carriage is constrained to a single degree-of-freedom of motion with respect to the machine base. In this embodiment, the motor stator is supported by a linear bearing on the machine base.

In a preferred embodiment, the stator is coupled to the frame so as to constrain the stator in only a single degree-of-freedom of motion with respect to the frame while allowing free movement in the other 5 degrees-of-freedom. The stator may be coupled to the frame by one or more elements selected from the group consisting of spherical bearings, universal joints, rotational bearings, linear bearings, planar bearings, and flexural elements. In one preferred embodiment, the stator is coupled to the frame by a series combination of a 2-degree-of-freedom coupling and a 3-degree-of-freedom coupling. The 2 degrees-of-freedom coupling may be a universal joint and the 3 degrees-of-freedom coupling may be a planar bearing.

In yet another embodiment, the stator is coupled to the frame by a flexural element comprising a notched hinge flexure having high stiffness on-axis and high compliance in the other 5 degrees-of-freedom. In an embodiment in which the carriage is constrained to a single degree-of-freedom of motion with respect to the machine base, the constraint is provided by a linear bearing set. A suitable linear bearing set may be selected from the group consisting of ball, roller, aerostatic or hydrostatic linear bearings. An encoder responsive to the location of the carriage with respect to the machine base may also be provided.

DESCRIPTION OF THE PREFERRED EMBODIMENT

Figure 1A:
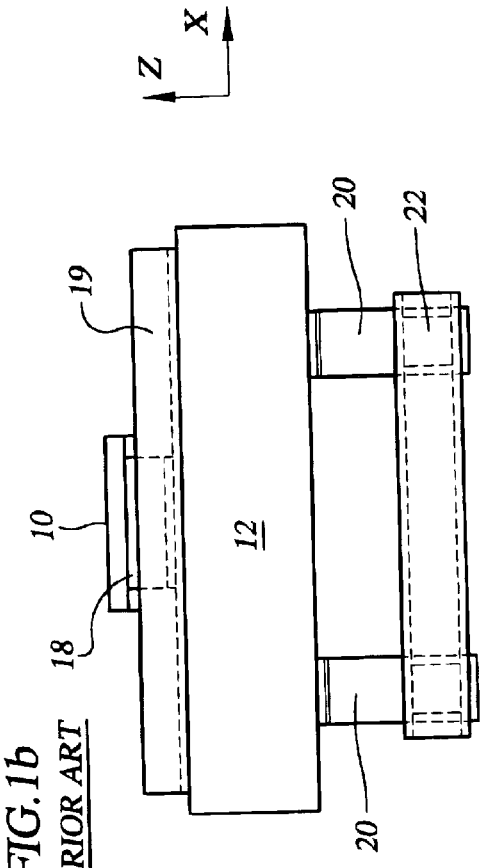
FIG. 1a is a cross-sectional view in the Y-Z plane of a prior art system.
Figure 1B:
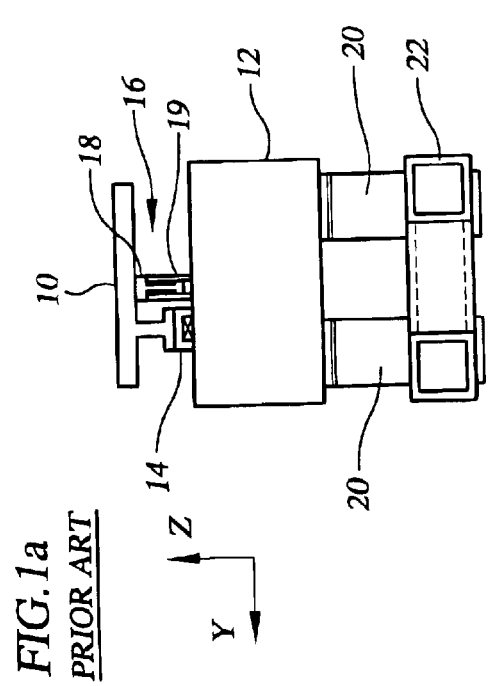
FIG. 1b is a cross-sectional view in the X-Z plane of this prior art machine.

For clarity, FIGS. 1a and 1b illustrate a simplified representation of a prior art machine showing one axis of motion only. A moving carriage 10 is mounted on a machine base 12 through a set of linear bearings 14. Those skilled in the art will recognize that the moving carriage 10 will support a work piece (not shown) whose motion is to be precisely controlled. The linear bearings 14 (ball, roller, aerostatic, hydrostatic, etc.) allow free motion in a primary axis direction while constraining motion in all other degrees-of-freedom. In FIG. 1a, the primary axis of motion illustrated will be into and out of the plane of FIG. 1a and will be along the X-axis in FIG. 1b.

A linear motor 16 provides forces to move the carriage 10 on-axis. The linear motor 16 includes a forcer 18 (typically the motor 16 coil) which is mounted to the carriage 10. The linear motor 16's stator 19 (typically a magnet track) is rigidly mounted to the machine base 12. As will be appreciated by those skilled in the art, position feedback is typically provided by a linear encoder or laser interferometer (not shown) that measures relative position between the carriage 10 and the machine base 12. The machine base 12 itself is mounted on passive vibration isolators 20. The passive vibration isolators 20 are in turn held together and supported on a floor (not shown) by a frame such as a welded steel frame 22.

When the motor forcer 18 drives the moving carriage 10 in the +X direction, a reaction force in the motor stator 19 accelerates the machine mass (all mass above the isolators 20, less the moving carriage 10 mass) in the −X direction. Unacceptable machine oscillation ensues.

Figure 2A:
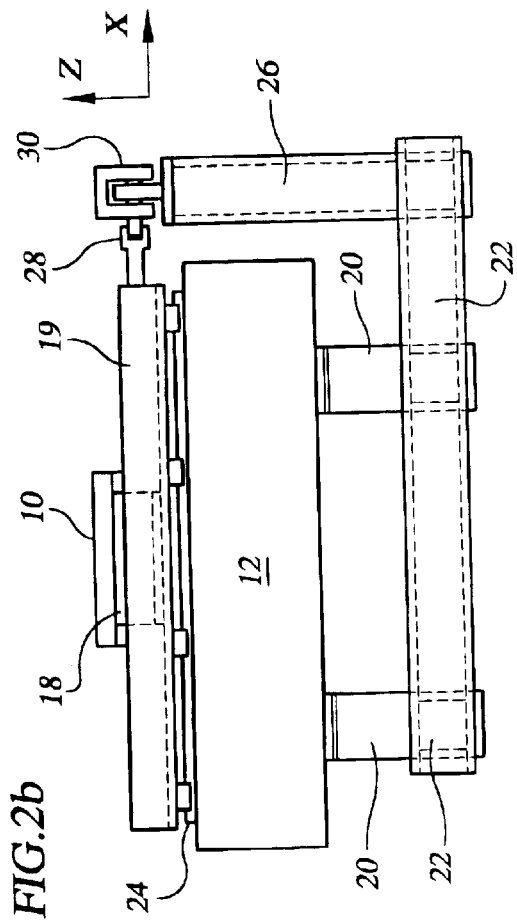
FIG. 2a is a cross-sectional view in the Y-Z plane illustrating an embodiment of the system of the invention.

The present invention will now be described in conjunction with the embodiment shown in FIGS. 2a and 2b. Instead of the linear motor stator 19 being rigidly secured to the machine base 12 as in the prior art of FIG. 1a, a linear bearing set 24 allows the stator 19 to move along the X-axis (single degree-of-freedom) with respect to the machine base 12 but constrains it in the other 5 degrees-of-freedom. The linear bearing set 24 may be ball, roller, aerostatic, hydrostatic, etc. That is, the stator 19 is free to move in a single degree-of-freedom with respect to the machine base 12.

Figure 2B:
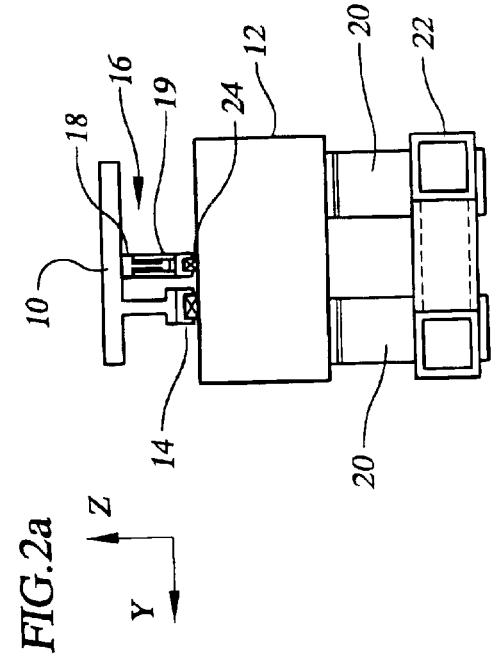
FIG. 2b is a cross-sectional view in the X-Z plane of this embodiment of the system of the invention.

As shown in FIG. 2b, an end of the stator 19 is coupled to an extension 26 of the frame 22. The coupling between the stator 19 and the frame extension 26 in this embodiment is provided by a universal joint 28 and a planar bearing 30. Relative to the frame extension 26, the stator is constrained along the X-axis (a single constrained degree-of-freedom), but is free to move in the other 5 degrees-of-freedom.

The function of the universal joint 28 and planar bearing 30 can be accomplished with any combination of mechanical elements which will constrain the motor stator 19 in but a single degree-of-freedom while still allowing free movement in the other 5 degrees-of-freedom. The combination of elements may include spherical bearings, universal joints, rotational bearings, linear bearings, and planar bearings. Another suitable coupling is a flexural element (notch hinge flexure) in a combination that has high stiffness on-axis and high compliance in the other 5 degrees-of-freedom.

Those skilled in the art will appreciate that any friction or spring-rate in the motor stator 19 constraint components' free directions will degrade the system's vibration isolation. An ideal implementation will thus utilize all aerostatic bearings. In this case, linear air bearings are used to mount the motor stator 19 with respect to the machine base 12. Spherical and planar air bearings in series will provide the single-degree-of-freedom constraint between the motor stator 19 and the frame extension 26.

In operation, when the motor forcer 18 drives the moving carriage 10 in the +X direction, for example, the reaction force in the motor stator 19 attempts to accelerate the frame extension 26 in the –X direction. No force is imparted to the isolated machine base 12 (assuming negligible friction in the linear bearing 24). Therefore, no horizontal motion is induced into the isolated machine base 12, and no transient excitation is introduced into other machine structures. The machine base 12 is still free to move in all 6 degrees-of-freedom, constrained only by the passive isolators 20. Therefore, the passive isolators 20 will still perform their function of isolating the machine base 12 from ambient environmental vibrations. Since the frame 22 is frictionally coupled to the floor, it does not move. Some vibration will be introduced into the frame 22 and the motor stator 19 by motion of the carriage 10. With proper design, however, the frequencies of these vibrations can be kept high enough not to influence overall machine performance.

It is recognized that a potential adverse effect of the reaction force transfer system of the invention is that any relative motion between the motor stator 19 and an encoder scale affixed to the machine base 12 will degrade motor 16 commutation performance. However, the ratio of the amplitude of any machine base 12 motion to the typical motor commutation period is small enough that this effect is minimal as has been verified experimentally.

For clarity of understanding, the present invention has been illustrated for motion along a single axis. Those skilled in the art will recognize that the disclosed technology can readily be extended to multiple axis motion applications.

What is claimed is:

1. Reaction force transfer system comprising:
    a frame;
    a machine base supported by the frame through passive isolation structure;
    a carriage supported for motion with respect to the machine base; and
    a motor having a stator coupled to the frame and a forcer coupled to the carriage to move the carriage with respect to the machine base wherein the carriage is constrained to a single degree-of-freedom of motion with respect to the machine base, wherein the motor stator is constrained to a single degree-of-freedom by a linear bearing on the machine base.

2. The system of claim 1 wherein the linear bearing set is selected from the group consisting of ball, roller, aerostatic, hydrostatic, or plain.

3. Reaction force transfer system comprising:
    a frame;
    a machine base supported by the frame through passive isolation structure;
    a carriage supported for motion with respect to the machine base; and
    a motor having a stator coupled to the frame and a forcer coupled to the carriage to move the carriage with respect to the machine base, wherein the stator is coupled to the frame so as to constrain the stator to only a single degree-of-freedom of motion with respect to the frame, while allowing free movement in the other 5 degrees-of-freedom.

4. The system of claim 3 wherein the stator is coupled to the frame by one or more elements selected from the group consisting of spherical bearings, universal joints, rotational bearings, linear bearings, planar bearings, and flexural elements.

5. The system of claim 3 wherein the stator is coupled to the frame by a series combination of a 2-degree-of-freedom coupling and a 3-degree-of-freedom coupling.

6. The system of claim 5 wherein the 2-degree-of-freedom coupling is a universal joint and the 3-degree-of-freedom coupling is a planar bearing.

7. The system of claim 4 wherein the flexural element is a notch hinge flexure having high stiffness on-axis and high compliance in the other 5 degrees-of-freedom.

8. Reaction force transfer system comprising;
    a frame;
    a machine base supported by the frame through passive isolation structure;
    a carriage supported for motion with respect to the machine base; and
    a motor having a stator coupled to the frame and a forcer coupled to the carriage to move the carriage with respect to the machine base wherein the carriage is constrained to a single degree-of-freedom of motion with respect to the machine base, wherein the carriage is constrained to a single degree-of-freedom of motion with respect to the machine base by a linear bearing set.

9. The system of claim 8 wherein the linear bearing set is selected from the group consisting of ball, roller, aerostatic, or hydrostatic.

* * * * *